United States Patent
Kuorelahti et al.

(10) Patent No.: US 6,424,708 B1
(45) Date of Patent: Jul. 23, 2002

(54) METHOD FOR CONCENTRATING SUBSCRIBERS IN A TELEPHONE NETWORK

(75) Inventors: Seppo Kuorelahti, Helsinki; Martti Yrjänä, Tupos; Reijo Romppanen, Oulu; Pekka Korhonen, Oulu; Toivo Lallukka, Oulu, all of (FI)

(73) Assignee: Nokia Network Oy, Espoo (FI)

(*) Notice: Subject to any disclaimer, the term of this patent is extended or adjusted under 35 U.S.C. 154(b) by 0 days.

(21) Appl. No.: 09/588,080

(22) Filed: Jun. 5, 2000

Related U.S. Application Data

(63) Continuation of application No. PCT/FI98/00957, filed on Dec. 9, 1998.

(30) Foreign Application Priority Data

Dec. 9, 1997 (FI) .................................................. 974469

(51) Int. Cl.[7] .......................... H04M 7/00; H04L 12/43
(52) U.S. Cl. ...................................... 379/219; 370/458
(58) Field of Search ........................ 379/219, 220.01, 379/229, 230, 207.02; 370/458, 459, 460, 461, 462, 463, FOR 120

(56) References Cited

U.S. PATENT DOCUMENTS 5,781,623 A   7/1998   Khakzar ................... 379/230

FOREIGN PATENT DOCUMENTS

| | | |
|---|---|---|
| EP | 0 734 186 | 9/1996 |
| WO | 97/16936 | 5/1997 |
| WO | WO-9848582 A1 * | 10/1998 ............ H04Q/7/38 |

OTHER PUBLICATIONS

ETSI 300 347–1 Signalling Protocols and Switching (SPS); V interfaces at the digital Local Exchange (LE) V5.2 interface for the support of Access Network (AN) Part 1: V5.2 interface specification.

ETSI 300 324–1 Signalling Protocols and Switching (SPS); V interfaces at the digital Local Exchange (LE) V5.2 interface for the support of Access Network (AN) Part 1: V5.1 interface specification.

* cited by examiner

Primary Examiner—Ahmad Matar
Assistant Examiner—Benny Q. Tieu
(74) Attorney, Agent, or Firm—Altera Law Group, LLC

(57) ABSTRACT

A procedure for concentrating subscribers in a telephone network comprising a local exchange (LE) provided with a first exchange terminal (1), a remote subscriber stage (RSS) provided with a second exchange terminal (2), a V5 interface (V5) connected to the second exchange terminal, and an interconnecting feeder (3) between the first and second exchange terminals through which subscribers connected via the V5 interface to the second exchange terminal are connected to the local exchange. According to the invention, a number of V5 interfaces (V5) are connected to the second exchange terminals (2) and the second exchange terminal is connected via the interconnecting feeder (3) to the first exchange terminal (1), thus forming a concentrating interface between the first and second exchange terminals.

5 Claims, 1 Drawing Sheet

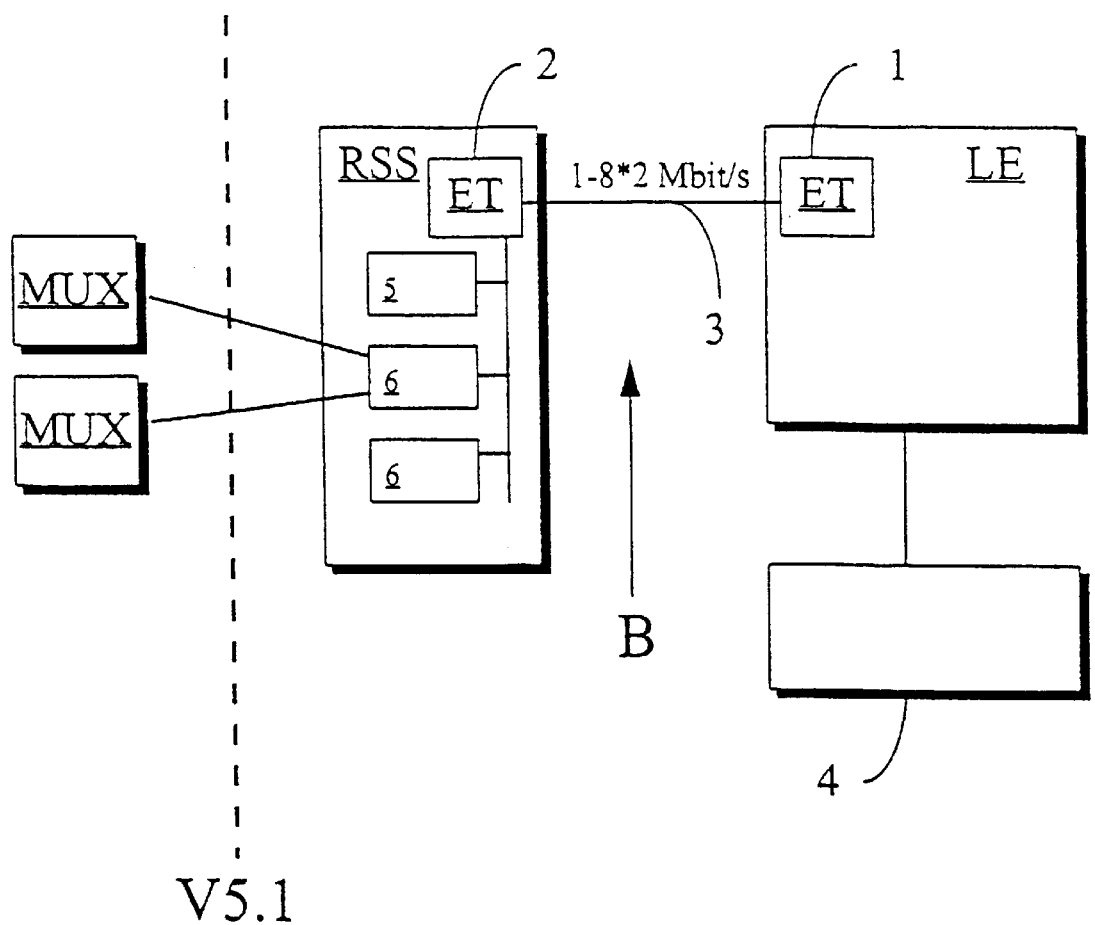

METHOD FOR CONCENTRATING SUBSCRIBERS IN A TELEPHONE NETWORK

This application is a continuation of international application Ser. No. PCT/FI98/00957, filed Dec. 9, 1998.

FIELD OF THE INVENTION

The present invention relates to a procedure for concentrating subscribers in a local exchange.

V5 interface standards ETS 300 324 and ETS 300 347 describe an interface between a local exchange and an access network and the functionality in each network element. The access network is the part of the local area network that contains the subscriber's lines. Thus, subscribers and subscriber's lines can be connected to the exchange either directly (direct subscribers) or via various multiplexers, a remote subscriber stage and/or concentrators. V5 interfaces enable subscribers belonging to a physically separate access network to be connected to a local exchange using a standard interface.

A static V5.1 multiplexer interface as defined in the ETS 300 324 standard series consists of one 2048 kbit/s PCM line. The V5.1 interface supports analogue telephones as used in the public telephone network, digital, such as ISDN (Integrated Services Digital Network) basic rate interfaces as well as other analogue or digital terminal equipment based on semi-fixed connections.

At present, the V5.1 interface is so implemented in the local exchange that one 5.1 concentrator can be connected to each exchange terminal. In a certain telephone network it is possible to connect a V5.1 concentrator to a remote subscriber stage, which is further connected to the local exchange via a single PCM line with a transfer capacity corresponding to that of the V5.1 interface, which preferably is 2 Mbit/s. Thus, voice time slots or B-channels are not concentrated between the remote subscriber stage and the local exchange because the V5.1 interface contains as many time slots as the interconnecting feeder between the remote subscriber stage and the local exchange, preferably 30 time slots.

Therefore, the problem is that if a plurality of V5.1 interfaces are to be connected to the local exchange via a remote subscriber stage, then the local exchange must be provided with as many exchange terminals or other interfaces intended for the remote subscriber stage, thus increasing the size and cost of the local exchange.

SUMMARY OF THE INVENTION

The object of the present invention is to eliminate the drawback described above. A specific object of the present invention is to disclose a solution in which concentration of time slots is implemented between the remote subscriber stage an the local exchange and the number of exchange terminals in the local exchange is reduced.

As for the features characteristic of the invention, reference is made to the claims.

In the procedure of the invention for concentrating subscribers in a telephone network, an access network is connected via a V5 interface either directly to a local exchange or to a remote subscriber stage. The telephone network preferably comprises a local exchange provided with a first exchange terminal, a remote subscriber stage provided with a second exchange terminal, a V5 interface connected to the second exchange terminal, and an interconnecting feeder between the first and second exchange terminals for connecting subscribers connected to the second exchange terminal via the V5 interface to the local exchange. The interconnecting feeder may be e.g. a 2 Mbit/s PCM line with 30 time slots or channels for subscriber calls.

According to the invention, a number of V5 interfaces are connected to the second exchange terminal and the second exchange terminal is connected via the interconnecting feeder to the first exchange terminal, a concentrating interface being thus formed between the first and second exchange terminals. The idea is that a greater number of subscribers are connected to the second exchange terminal via a V5 interface than the interconnecting feeder is able to transmit at a time. Therefore, one remote subscriber stage and one local exchange may comprise a plurality of remote subscriber stages connected in pairs by one interconnecting feeder.

As compared with prior art, the invention provides the advantage that concentration allows reduction of the exchange terminal capacity needed in the local exchange for subscribers using V5.1 or concentrator interfaces. Moreover, the invention makes it possible to simplify telephone network interconnection and structure, which also reduces the costs.

In addition, the V5.1 lines starting from the concentrators are shorter because they only connect them to the remote subscriber stage, which functions as a concentrator between the access network and the exchange. In other words, the subscriber interface of the local exchange can be brought closer to the subscribers.

Time slot and/or V5 interface data regarding the V5 interface used by the subscriber are stored in a subscriber database, said data being used during call setup for the scanning of the time slots in the interconnecting feeder between the remote subscriber stage and the local exchange to find and assign a free time slot for the subscriber. The second exchange terminal, to which the V5 interface used by the subscriber is connected, is informed of the time slot assigned for the subscriber in the interconnecting feeder so that the second exchange terminal will be able to connect the subscriber's V5 interface time slot to the correct time slot in the interconnecting feeder between the remote subscriber stage and the local exchange. A time slot in the interconnecting feeder is preferably assigned separately for each call, which means that dynamic resource allocation in the interconnecting feeder is implemented.

The V5.1 concentrator and the subscriber lines connected to it are preferably connected via a V5 interface to the remote subscriber stage, which is connected to the local exchange e.g. via a 2 Mbit/s PCM line. The V5 interface may be a standard V5.1 or V5.1 interface.

DESCRIPTION OF THE DRAWINGS

In the following, the invention will be described by referring to the attached drawing, which presents a system according to a preferred embodiment of the present invention.

DETAILED DESCRIPTION OF THE PREFERRED EMBODIMENT

The diagrammatic drawing shows a local exchange LE, a remote subscriber stage RSS connected to it and two concentrators MUX connected to the remote subscriber stage. The local exchange LE an the remote subscriber stage RSS are provided with exchange terminals 1, 2, respectively. The first and the second exchange terminals 1, 2 are connected by one or more PCM lines having a capacity of e.g. 2 Mbit/s. Moreover, the remote subscriber stage RSS, which is a concentrator for a maximum of about one thousand subscribers, comprises a controller 5 for a first subscriber module of the remote subscriber stage and one or more V5.1 subscriber module controllers 6.

In the drawing, the concentrators are connected via a V5 interface to the same V5.1 subscriber module controller and through it further to the second exchange terminal 2. Thus, 60 subscribers are connected to the second exchange terminal 2, because one V5.1 interface can transmit 30 subscribers. By connecting the first and second exchange terminals via one interconnecting feeder, a concentrating interface (arrow B) with a concentration ratio of 60/30 is formed between the exchange terminals, 30 channels being reserved for 60 subscribers.

The V5 interface software is mainly located in a call control computer 4 in the local exchange LE. The V5.1 subscriber module controller 6 of the remote subscriber stage RSS takes care of through-connection from the V5.1 interface line to the interconnecting feeder 3. When a subscriber is created in the local exchange, a time slot in the V5.1 line is assigned for the subscriber and the time slot data is stored in the subscriber database, which generally is located in the local exchange LE. In call setup, the signalling software of the local exchange transmits the voice time slot of the subscriber's V5.1 interface and the scanned time slot of the interconnecting feeder to the subscriber module 6 of the remote subscriber stage RSS for through-connection. After this, through-connection is effected and the subscriber's call setup process can be continued.

The invention is not restricted to the examples described above. Thus, many variations are possible within the scope of the invention idea defined by the claims.

What is claimed is:

1. A method for concentrating subscribers in a telephone network comprising:

providing a local exchange with a first exchange terminal, providing a remote subscriber stage with a second exchange terminal, connecting a V5 interface to the second exchange terminal, and coupling an interconnecting feeder between the first and second exchange terminals, through which subscribers connected via the V5 interface to the second exchange terminal are connected to the local exchange, wherein a number of V5 interfaces are connected to the second exchange terminal and the second exchange terminal is connected via the interconnecting feeder to the first exchange terminal, a concentrating interface being thus formed between the first and second exchange terminals, wherein when creating a subscriber, a time slot and/or V5 interface data regarding the V5 interface used by the subscriber are stored in a subscriber database, and during call setup, a free time slot is scanned in the interconnecting feeder and assigned for the subscriber.

2. The method as defined in claim 1, wherein a number of V5 interfaces are connected to the second exchange terminal.

3. The method as defined in claim 1, wherein data indicating the time slot of the interconnecting feeder and the V5 interface time slot assigned for the subscriber is sent to the second exchange terminal to which the V5 interface used by the subscriber is connected.

4. The method as defined in claim 1, wherein the concentrator is connected to the local exchange via a V5 interface.

5. The method as defined in claim 1, wherein a V5 interface is used which is a standard V5.1 interface or a standard V5.2 interface.

* * * * *